July 26, 1932.  W. E. GUEST  1,868,826
MILK TANK
Filed Jan. 12, 1931
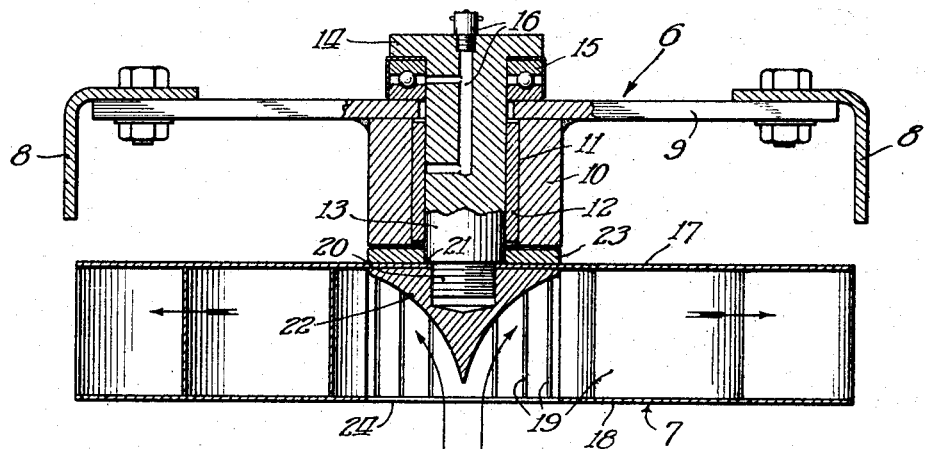
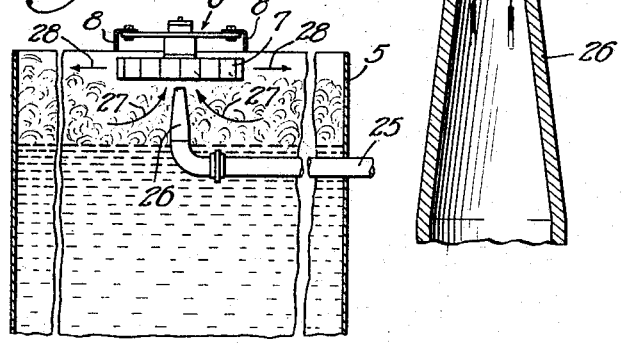
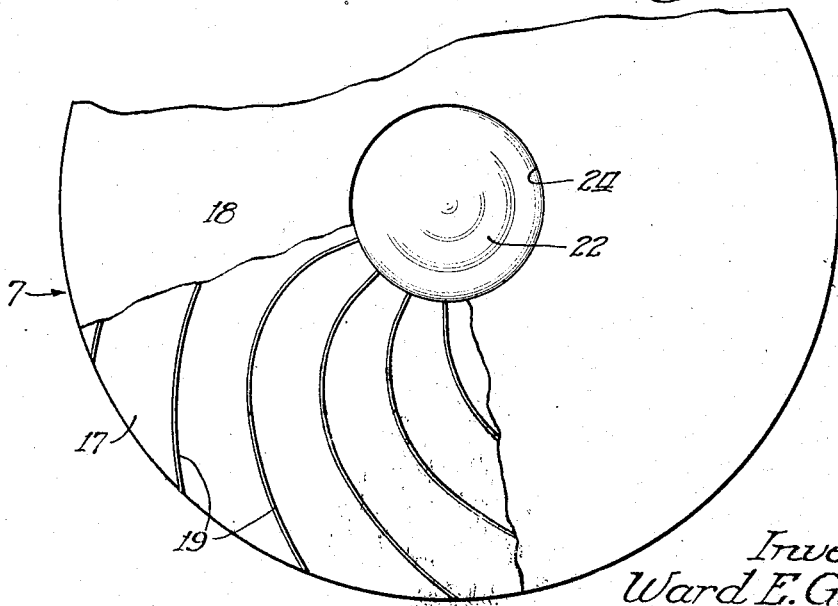
Inventor
Ward E. Guest
By Fisher, Clapp, Soans & Pond Attys Patented July 26, 1932

1,868,826

UNITED STATES PATENT OFFICE

WARD E. GUEST, OF CHICAGO, ILLINOIS, ASSIGNOR TO KRAFT-PHENIX CHEESE CORPORATION, OF CHICAGO, ILLINOIS, A CORPORATION OF DELAWARE

MILK TANK

Application filed January 12, 1931. Serial No. 508,324.

This invention relates to milk tanks and the like and more particularly to storage tanks for milk and the like.

The objects of the invention are to provide improved means in a tank of the class described for dispelling or breaking down foam which forms in the tank as an incident to the discharge of milk or other liquids discharged into the tank; to provide such a means which will be efficient but low in cost of operation, construction and maintenance; and in general, it is an object of the invention to provide an improved milk tank of the class described.

Other objects and advantages will be understood by reference to the following specification and accompanying drawing, in which the invention is illustrated as applied to a milk tank.

In the drawing:

Fig. 1 is a fragmentary sectional view through a milk storage tank,

Fig. 2 is a section similar to a portion of Fig. 1 but illustrating the details of construction of the means for breaking down foam, and Fig. 3 is a fragmentary plan of an element of the foam breaking device, certain parts being broken away to more clearly illustrate the structure.

Referring now to the drawing, my invention comprises a storage tank 5 constructed of suitable material and of suitable size, and mechanism indicated at 6 for breaking down foam which forms in the top of the tank as an incident to the discharge of milk thereinto.

The tank 5 may be of circular construction and of comparatively large diameter; for example, about 12 feet. The foam breaking device which includes a rotating element 7 may conveniently be much smaller in diameter; for example, about 1 foot. The depth of the tank may be varied widely and may be such as best suits the convenience of the user. The foam breaking device 6 is supported in the upper portion of the tank centrally thereof by means of angle iron or like cross bars 8 which rest on the upper edge of the tank.

The construction of the foam breaking device is clearly shown in Figs. 2 and 3 and includes a bracket member 9 which extends between and is secured at its ends to the supporting cross members 8. The bracket 9 includes a hub or boss 10 which may be formed as an integral part thereof or otherwise, the boss or hub 10 being apertured as indicated at 11 to receive a bushing 12. The bushing 12 constitutes a bearing for a shaft 13 which is freely rotatable within the bushing. The upper end of the shaft 13 is provided with an outwardly extending flange portion 14 which serves to support the shaft in predetermined vertical position relative to the bracket 9, a suitable ball bearing 15 being interposed between the flange 14 and bracket 9 to facilitate free running of the shaft. Suitable means such as indicated at 16 may be provided for supplying lubricant under pressure to the bearing surfaces.

The rotating element 7 is secured to the lower end of the shaft 13 so as to be rotatably supported thereby. This rotor comprises a top plate 17, a bottom plate 18 and a plurality of blades or vanes 19 which extend between the top and bottom plates 17 and 18 in spaced relation. The top plate 17 is apertured to fit over the threaded reduced end portion 20 of the shaft 13 and so as to seat on the shoulder 21 formed as an incident to the provision of the said reduced threaded end portion 20. A nut 22 in the form of an inverted cone having a concave surface fits the threaded end portion 20 of the shaft and serves to clamp the rotor to the said shaft. A suitable washer 23 may be interposed between the top plate 17 and the lower end of the bearing hub 10 to prevent excessive vertical movement of the rotor and to avoid excessive wear between the relatively moving parts. The lower plate 18 of the rotor is provided with an opening 24 through which the nut 22 may be applied as above described, it being understood that the plates 19 terminate at their inner ends approximately at the inner edge of the plate 18 as illustrated.

The blades or vanes 19 are preferably spirally curved substantially as indicated in Fig. 3 so that liquid entering the rotor through the opening 24 in the bottom plate and passing outwardly through the spaces between the blades will be effective to actuate the rotor as an incident to the outward flow of the liquid.

For actuating the rotor, I provide a supply line or pipe 25 which enters the tank, preferably through the wall thereof at a point spaced considerably below the top edge of the tank, this supply line being provided with a discharge nozzle 26 which is so positioned as to direct the stream of milk or other liquid through the opening 24 in the bottom plate of the rotor and against the nut 22 which spreads or diverges the stream in all directions from the axis of the rotor and against the rotor blades 19. It will be seen that the rotor will thus be actuated by the flow of the liquid discharged into the tank. As an incident to such rotation of the rotor, an auxiliary draft or flow will be established, this flow entering the rotor through the opening 24 around the stream of liquid discharged from the nozzle 26 and then following the liquid outwardly through the spaces between the blades 19. This auxiliary flow will consist of foam which forms in the top of the tank and most, if not all, of the foam which is drawn into the rotor will be broken up by engagement of the various blades with the bubbles which make up the foam. Hence, the rotating element is operative to break down the foam and to restore the same to its normal liquid condition. In Fig. 1, the auxiliary flow of foam into the rotor is indicated by arrows designated 27, and arrows 28 indicate the discharge flow which includes both the liquid discharged by the nozzle 26 and the liquid resulting from the breaking down of the foam.

The above described mechanism operates as an incident to the discharge of liquid into the tank, and hence is extremely economical to operate in that no electric motor or other driving means is required. It is also of simple construction which can obviously be made strong and durable at low cost, and which will not readily become out of order.

Changes may be made in the above described structure without departing from the spirit of the invention, the scope of which should be determined by reference to the following claims, the same being construed as broadly as possible consistent with the state of the art.

I claim as my invention:

1. In combination, a liquid storage tank, means for supplying liquid to said tank in a vertically directed stream, and means for breaking down foam formed in the tank comprising an axially vertical rotor located in the upper portion of the tank in the path of said vertically directed stream so as to be engaged and actuated thereby, said rotor including a plurality of blades and a center member for diverging said stream of liquid to said blades.

2. In combination, a liquid storage tank, means for supplying liquid to said tank in a vertically directed stream, an axially vertical rotor, means for mounting said rotor in the upper portion of said tank, said rotor including relatively spaced top and bottom plates and a plurality of blades or vanes extending between said plates, one of said plates being provided with a centrally disposed opening through which said stream is adapted to enter that rotor, and means disposed centrally of and between said plates for diverging and directing against said vanes, the stream of liquid entering the rotor to thereby actuate the same.

3. In combination, a liquid storage tank, means for supplying liquid to said tank in a vertically directed stream, and means for breaking down foam formed in the tank, comprising an axially vertical rotor having its axis disposed substantially in line with and in the path of said stream, said rotor being actuated by said stream and serving to distribute the liquid thereof outwardly from its axis.

4. In combination, a liquid storage tank, means for supplying liquid to said tank in a vertically directed stream, and means for breaking down foam formed in the tank, comprising an axially vertical rotor having its axis disposed substantially in line with and in the path of said stream, said rotor having a distributing member which is impacted upon by said stream, and a plurality of vanes directed from said distributing member toward the outer periphery of said rotor, the liquid being distributed outwardly by said distributing member and serving to actuate said rotor by impingement upon said vanes.

5. In combination, a liquid storage tank, means for supplying liquid to said tank in a vertically directed stream, and means for breaking down foam formed in the tank, comprising an axially vertical rotor having its axis disposed substantially in line with and in the path of said stream, said rotor having a distributing member which is impacted upon by said stream, and a plurality of substantially spiral vanes directed from said distributing member toward the outer periphery of said rotor, the liquid being distributed outwardly by said distributing member and serving to actuate said rotor by impingement upon said vanes.

6. In combination, a liquid storage tank, means for supplying liquid to said tank in a vertically directed stream, and means for breaking down foam formed in the tank, comprising an axially vertical rotor having its axis disposed substantially in line with and in the path of said stream, said rotor having a distributing member substantially in the form of a concave cone having its vertex directed toward said stream, and a plurality of vanes directed from said distributing member toward the outer periphery of said rotor, the liquid being distributed outwardly by said distributing member and serving to actuate said rotor by impingement upon said vanes.

7. In combination, a liquid storage tank, means for supplying liquid to said tank in a vertically directed stream, and means for breaking down foam formed in the tank, comprising an axially vertical rotor having its axis disposed substantially in line with and in the path of said stream, said rotor having a distributing member substantially in the form of a concave cone having its vertex directed toward said stream, and a plurality of substantially spiral vanes directed from said distributing member toward the outer periphery of said rotor, the liquid being distributed outwardly by said distributing member and serving to actuate said rotor by impingement upon said vanes.

WARD E. GUEST.